(12) United States Patent
Allen et al.

(10) Patent No.: US 8,319,405 B2
(45) Date of Patent: Nov. 27, 2012

(54) METHODS AND APPARATUSES FOR ATTACHING A STATOR CORE TO A GENERATOR FRAME

(75) Inventors: David T. Allen, Longwood, FL (US); John B. Sargeant, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 287 days.

(21) Appl. No.: 12/859,873

(22) Filed: Aug. 20, 2010

(65) Prior Publication Data

US 2012/0043861 A1    Feb. 23, 2012

(51) Int. Cl.
*H02K 1/18* (2006.01)
(52) U.S. Cl. .................. 310/431; 310/413; 310/415
(58) Field of Classification Search .......... 310/408–433, 310/91
See application file for complete search history.

(56) References Cited

U.S. PATENT DOCUMENTS

| | | | |
|---|---|---|---|
| 4,425,523 A * | 1/1984 | Detinko et al. | 310/433 |
| 4,663,553 A * | 5/1987 | Zimmermann | 310/419 |
| 4,891,540 A * | 1/1990 | Cooper et al. | 310/433 |
| 4,975,613 A * | 12/1990 | Brem et al. | 310/419 |
| 5,442,249 A * | 8/1995 | Zimmermann | 310/91 |
| 5,875,540 A | 3/1999 | Sargeant | |
| 6,091,177 A * | 7/2000 | Carbonell et al. | 310/426 |
| 6,498,417 B2 * | 12/2002 | Fuller | 310/216.113 |
| 6,628,027 B2 * | 9/2003 | Fuller | 310/91 |
| 7,202,587 B2 | 4/2007 | Sargeant | |
| 7,302,754 B2 | 12/2007 | Majernik | |
| 7,353,586 B2 | 4/2008 | Majernik | |
| 7,653,986 B2 | 2/2010 | Majernik | |
| 8,040,014 B2 * | 10/2011 | Boardman et al. | 310/216.129 |
| 2002/0074894 A1 * | 6/2002 | Fuller | 310/258 |

* cited by examiner

*Primary Examiner* — Thanh Lam

(57) ABSTRACT

A generator including a generator frame (2, FIG. 1), frame rings (4) extending from an inside surface of the frame (2), stacked laminations forming a stator core (88) disposed within the generator frame (2), a spring bar (40, FIG. 2) spanning a distance between at least two frame rings (4), a first spring bar end attached to a first frame ring (4) and a second opposing spring bar end attached to a second frame ring (4), at least one bracket (80) attached to the spring bar (40); and a first and a second keybar (84) attached to the bracket (80), each keybar (84) for engaging a corresponding groove within the stator core (88).

25 Claims, 7 Drawing Sheets

METHODS AND APPARATUSES FOR ATTACHING A STATOR CORE TO A GENERATOR FRAME

FIELD OF THE INVENTION

The present invention relates to electric power generators and more specifically to methods and apparatuses for attaching a stator core to a generator frame.

BACKGROUND OF THE INVENTION

The generator stator core is the largest monobloc component in a turbine-generator set. The stator core comprises thousands of thin steel laminations that are stacked and clamped together to form a cylindrical stator core. Each lamination defines a central opening and thus when stacked together the opening extends the axial length of the core. A rotating rotor within the opening generates electric current in stator windings that are wound into the core.

Steady-state and transient forces generated during normal operation and transient conditions distort the core geometric shape. Improperly attaching the core to the frame can cause lamination vibrations due to magnetic impulses and core elliptical dilation (i.e., distorting the core from a circle to an ellipse). The core dilation effect is more prevalent in two pole generators (inducing a two lobe core distortion) than in four pole generators (inducing a four lobe core distortion). Also, mechanical fatigue effects caused by the vibrations can lead to premature failure of the generator.

It is known, for example see commonly-owned U.S. Pat. No. 5,875,540 incorporated herein by reference, to overcome some of the problems with prior art assembly techniques by first assembling then joining a number of laminations, collectively referred to as a donut. A plurality of these donuts are then stacked (vertically or horizontally) to form the stator core. This process saves substantial time when compared with individually assembling the laminations and also produces fewer core flaws.

When individual laminations or a plurality of laminations in the form of a donut are formed into a core, they engage axially-extending keybars disposed on an inside surface of the generator frame. The keybars are rod-like or bar-like members that extend a length of the frame and attach to internal frame structures (e.g., frame rings). An inwardly-facing surface of the keybar comprises a projection that engages axial grooves in the outer circumference of the laminations (donuts).

FIG. 1 is a cutaway view of a generator frame 2 prior to insertion of the laminations or donuts. Keybars 6 run an internal axial length of the frame 2 and are generally attached to the support rings 4 via a transition adapter plate 5 (see FIG. 2). The support rings 4 are attached to the generator frame 2 as illustrated in FIG. 1.

The laminations and keybars are engaged with complementary grooves as shown in FIG. 2, illustrating a dovetail keybar profile. Each lamination 10 defines a plurality of notches 12 about a circumference of the lamination. The notches 12 match a complementary profile of the keybar 6. When a plurality of laminations is attached together, the aligned notches form an axial groove. Thus several axial grooves are disposed about a circumference of the core. By sliding the laminations 10 onto the keybars 6, the laminations 10 are secured to the generator frame 2. Since the stator core vibrates during operation, it is critical for the keybars and any keybar attachments to be rigidly attached to the core and to the generator frame.

Since the laminations may be mounted individually or as donuts, if the fit between the lamination grooves 12 and the keybars 6 is too tight, field installation can be very difficult or, in the extreme, impossible. Thus there is a need for structural elements and processes that permit the laminations or donuts to be easily placed onto keybars then secured to the generator frame.

Those skilled in the art recognize that given the wide variety of available generator styles and ratings, there exists a wide variety of generator frame constructions, stator constructions and core attachment elements. It is desired to provide technically sound (i.e., providing the required structural rigidity while also limiting frame vibrations) and expedient techniques and structural members for attaching the core to the frame.

BRIEF DESCRIPTION OF THE DRAWINGS

The invention is explained in the following description in view of the drawings that show.

DETAILED DESCRIPTION OF THE INVENTION

Figure 1:
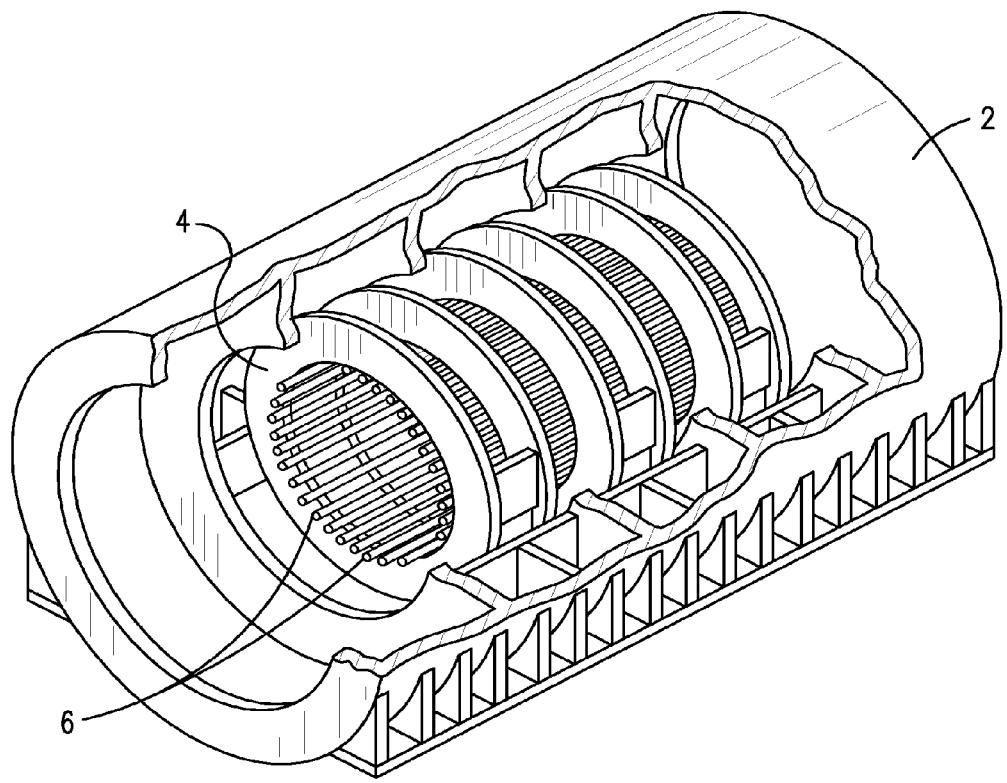
FIGS. 1 and 2 illustrate internal structural members of a prior art generator.
Figure 2:
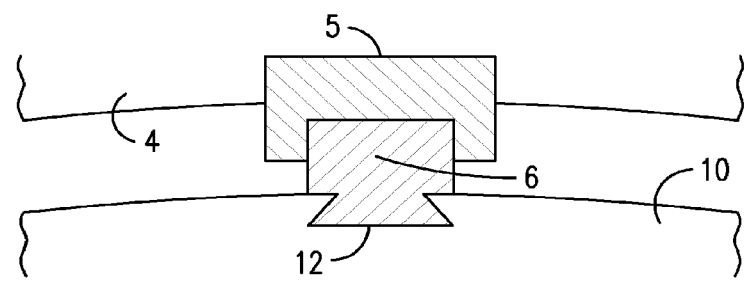

Before describing in detail the particular methods and apparatuses related to attaching the generator stator core to the generator frame in accordance with various aspects of the present invention, it should be observed that the present invention, in its various embodiments, resides primarily in a novel and non-obvious combination of hardware and method steps related to these methods and apparatuses. Accordingly, the hardware and method steps have been represented by conventional elements in the drawings, showing only those specific details that are pertinent to the present invention so as not to obscure the disclosure with structural details that will be readily apparent to those skilled in the art having the benefit of the description herein.

The following embodiments are not intended to define limits of the structures or methods of the invention, but only to provide exemplary constructions. The embodiments are permissive rather than mandatory and illustrative rather than exhaustive.

The various embodiments of the present invention may be practiced to replace existing core-to-frame attachment structures with structures that permit insertion and adjustment of donut core sections (or individual laminations) within existing generator frames, prior to attachment of the core sections to the frame. Two embodiments of the invention include a force-absorbing or vibration-absorbing connection between the generator frame and the stator core and a rigid connection between the frame and the core. The attachment techniques of the force-absorbing embodiment are especially useful for reducing generator stator vibrations. Prior art techniques employ a "hard mount" system that transfers stator core vibrations to the generator frame and to the structure (e.g., floor) on which the generator is mounted.

One important feature of the invention enables rigid core donuts to be located with practical assembly clearances in any generator frame. After adjustment of the core donuts, they are connected to the frame using spring bars according to a first embodiment or directly to the frame according to a second embodiment. The vibration isolation associated with the first embodiment is due to the use and placement of the spring bars that attach the core to the frame.

The first embodiment as illustrated in FIGS. 3-9 is characterized as "low" tuned support systems, i.e., the natural torsional frequency of the stator core and the stator winding, when mounted with a force-absorbing structural member as described herein, is lower than forcing frequencies (i.e., the line frequency and two times the line frequency) generated during a generator short circuit or another transient event. The stiffness of the spring bar and its associated components exhibits a desired low natural torsional frequency and thereby minimizes torque amplification or 'torque build up' that occurs during a transient incident, such as a short circuit. This concept also tends to isolate the frame and foundation from core vibratory motion during normal operation. These advantageous characteristics are the result of the structural components of the invention, which allows the installation of core laminations or donuts into generator frames of various designs.

The inventive support system can be applied to both four and two pole generators, although the support system may be more beneficial when applied to two pole generators as they experience larger core vibrations.

Figure 3:
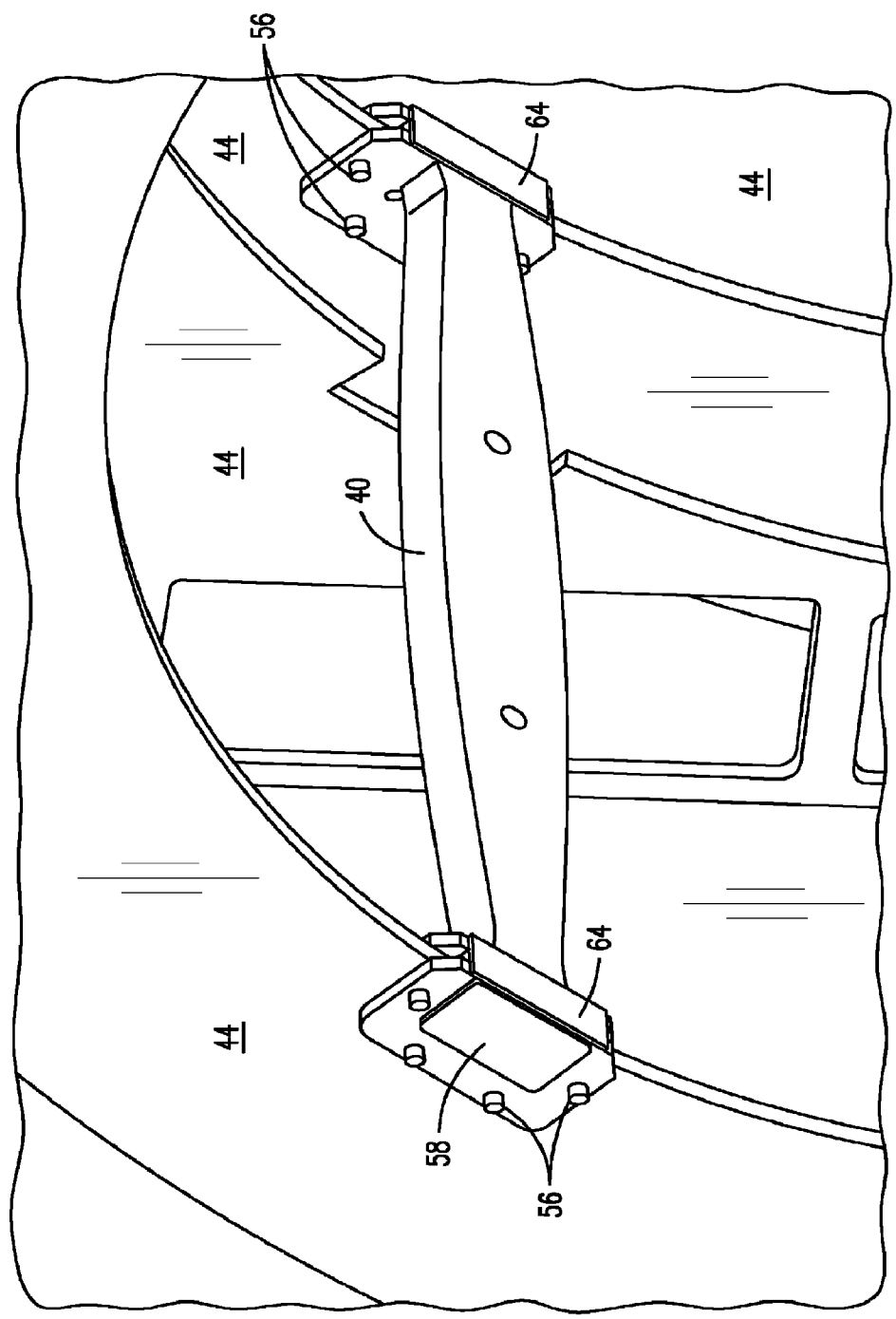
FIGS. 3-5 illustrate a spring bar and associated components according to an embodiment of the present invention for attaching the core to the generator frame.
Figure 4:
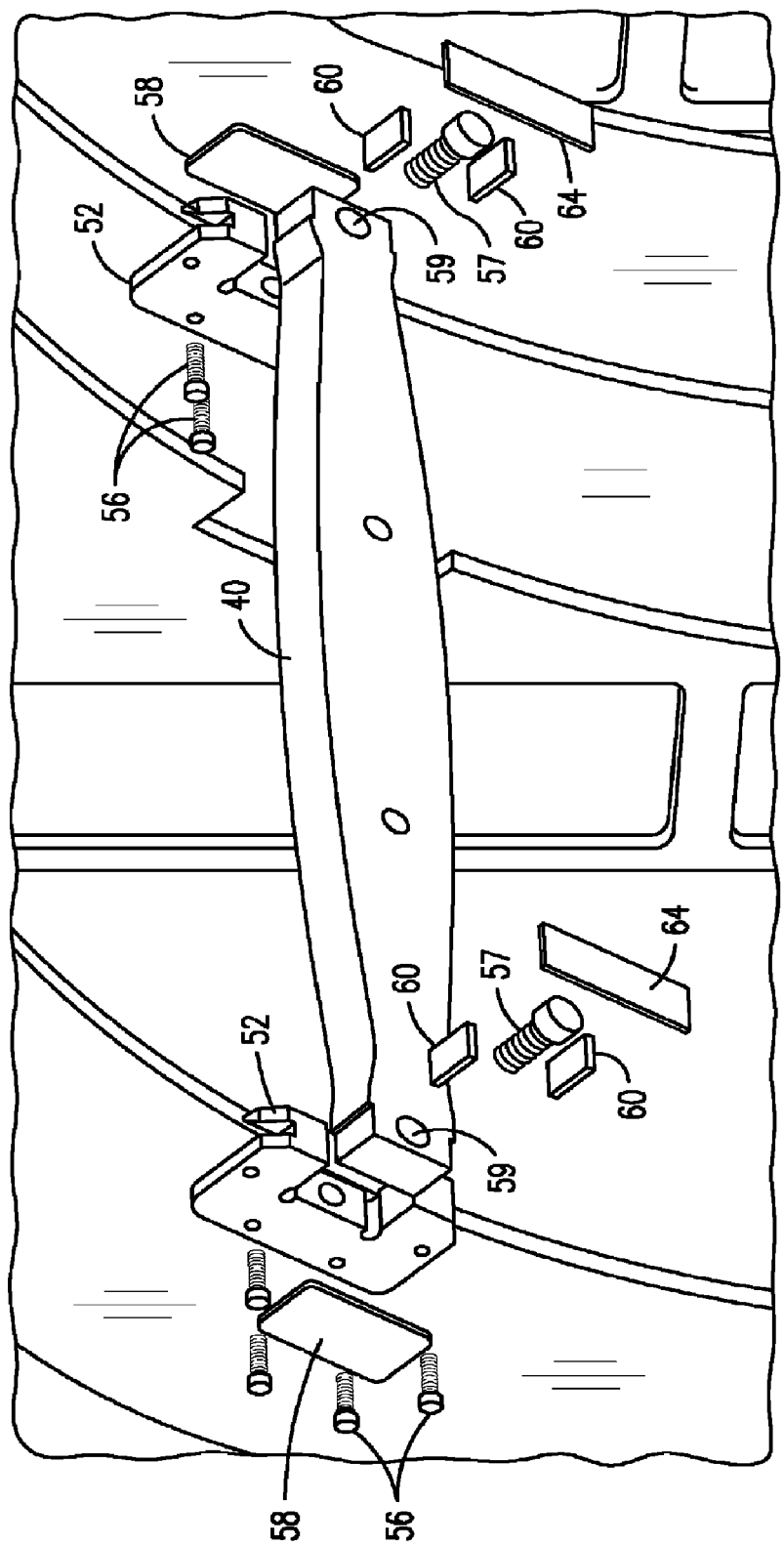

Referring to FIG. 3 and the exploded version of FIG. 4, an axial spring bar 40 spans a space between two successive frame rings 44 (also referred to as section rings). The spring bars 40 are generally located at multiple positions around the inner circumference of the frame rings 44. In one application, several spring bars are disposed proximate the 3 o'clock and 9 o'clock positions. However the present invention encompasses the use of any number of spring bars disposed at any location around the circumference of the generator core.

Each frame ring 44 defines a notch for receiving opposing ends of the spring bar 40. As shown more clearly in FIG. 4, a clevis 52 engages each frame ring notch and is affixed to the frame ring 44 with fasteners 56. A fastener 57 affixes each spring bar end within the U-shaped opening of the clevis 52.

In one embodiment the spring bar spans the distance between two successive frame rings and an intermediate frame ring. In this embodiment it is necessary to form a notch in the intermediate frame ring to provide clearance for the spring bar. The spring bar passes through the notch.

Another embodiment excludes the clevises. Instead, the spring bar ends are inserted in the frame ring notches and welded to the frame rings. Special known welding procedures may be required to weld the high-strength steel spring bars to the mild steel frame rings.

An end plate 58 covers an end surface of each end of the spring bar 40. Typically the end plate 58 is welded to the clevis 52.

After the spring bar 40 is attached to the two clevises 52 at each end with the fastener 57 loosely engaged, the spring bar 40 is adjusted to accommodate attachment to the keybars, as described below. Once the proper spring bar location is determined, wedges 60 are inserted into a gap between end regions of the spring bar 40 and opposing clevis surfaces. The wedges 60 are welded to the clevis 52 and a cap 64 is then welded to the clevis 52.

The wedges 60 may be preferred to overcome a designed-in relaxed fit between the mating components. The notch is typically oversized relative to the dimensions of the spring bar ends and a hole 59 at each spring bar end for receiving the fastener 57 is oversized relative to a diameter of the fastener 57.

Figure 5:
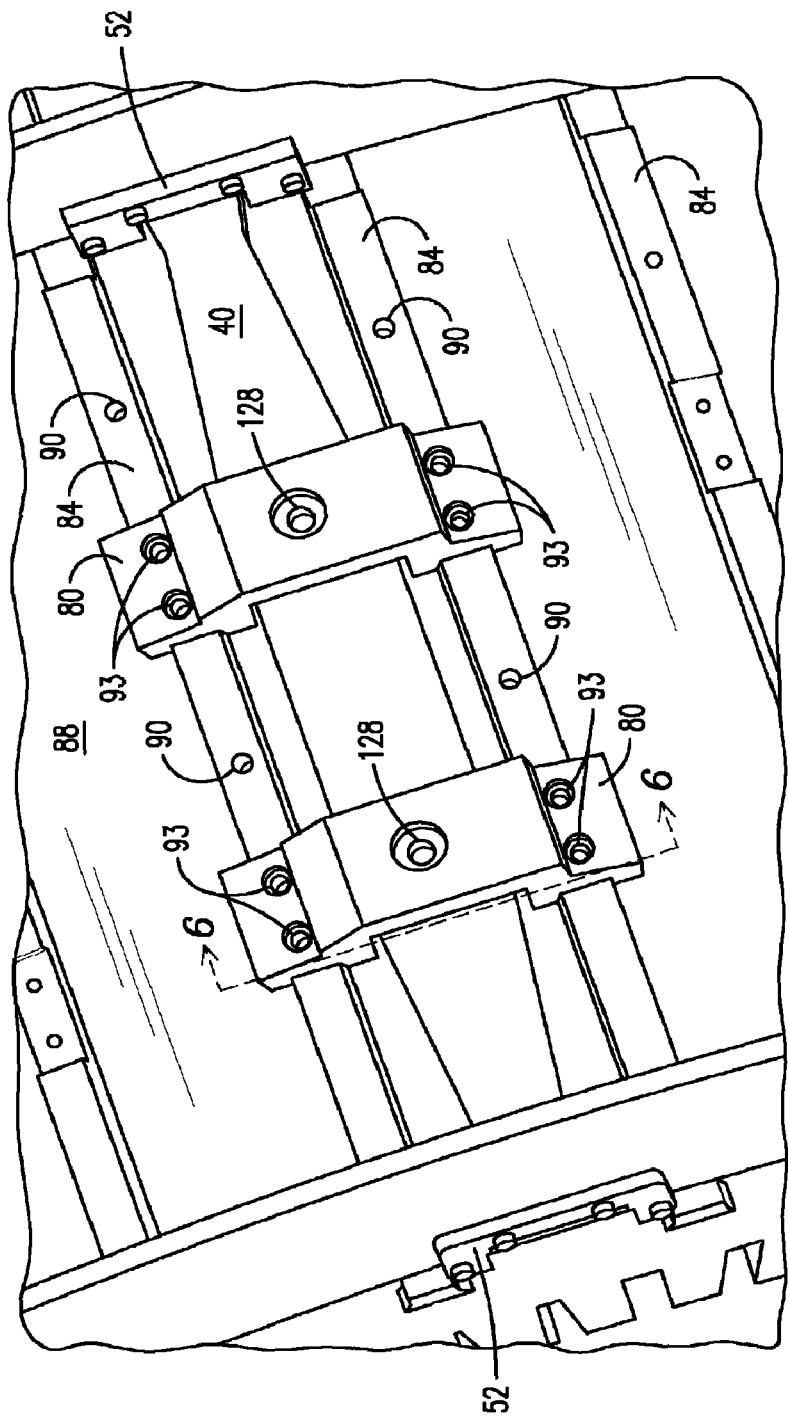

FIG. 5 illustrates the spring bar 40 and two brackets 80 attached to both the spring bar 40 and the keybars 84 using appropriate fasteners; FIG. 5 illustrates a plurality of openings for receiving fasteners for attaching the various elements of the invention; the fasteners are further illustrated in FIG. 6. The FIG. 5 embodiment does not include an intervening frame ring having a notch formed therein, as in the embodiment of FIGS. 3 and 4.

Grooves in the laminations or donuts are mated with complementary projections from the keybars 84 to mate the two structural members. With the brackets 80 attached to the keybars 84 and the spring bars 40, the core 88 (and thus its constituent donuts (also referred to as a subgroup of laminations) and individual laminations) is resiliently affixed to the generator frame.

FIG. 5 illustrates additional openings 90 in the keybars 84. These openings 90 receive fasteners for tightening the keybars 84 against an outside surface of the core 88 to ensure good electrical conductivity. Alternatively, the keybars 84 can be insulated from the outside surface of the core. Intermittent contact between the keybars 94 and the outside surface of the core is to be avoided.

As is known, after the keybars are rigidly affixed, the position of the keybars cannot be adjusted. Thus to accommodate manufacturing and installation variations in keybar location and shape it is necessary to provide various adjustment mechanisms in the brackets and the spring bar, as described herein.

The order of executing the steps for assembling the various components can be modified from the described order. For example, the spring bar 40 can be attached to the clevises 52, the brackets 80 then attached to the spring bar 40 and finally the brackets 80 attached to the keybars 84. Alternatively, the brackets 80 can be attached to the spring bar 40, then the brackets 80 attached to the keybars 84 and finally the spring bar 40 attached to the clevises 52.

Figure 6:
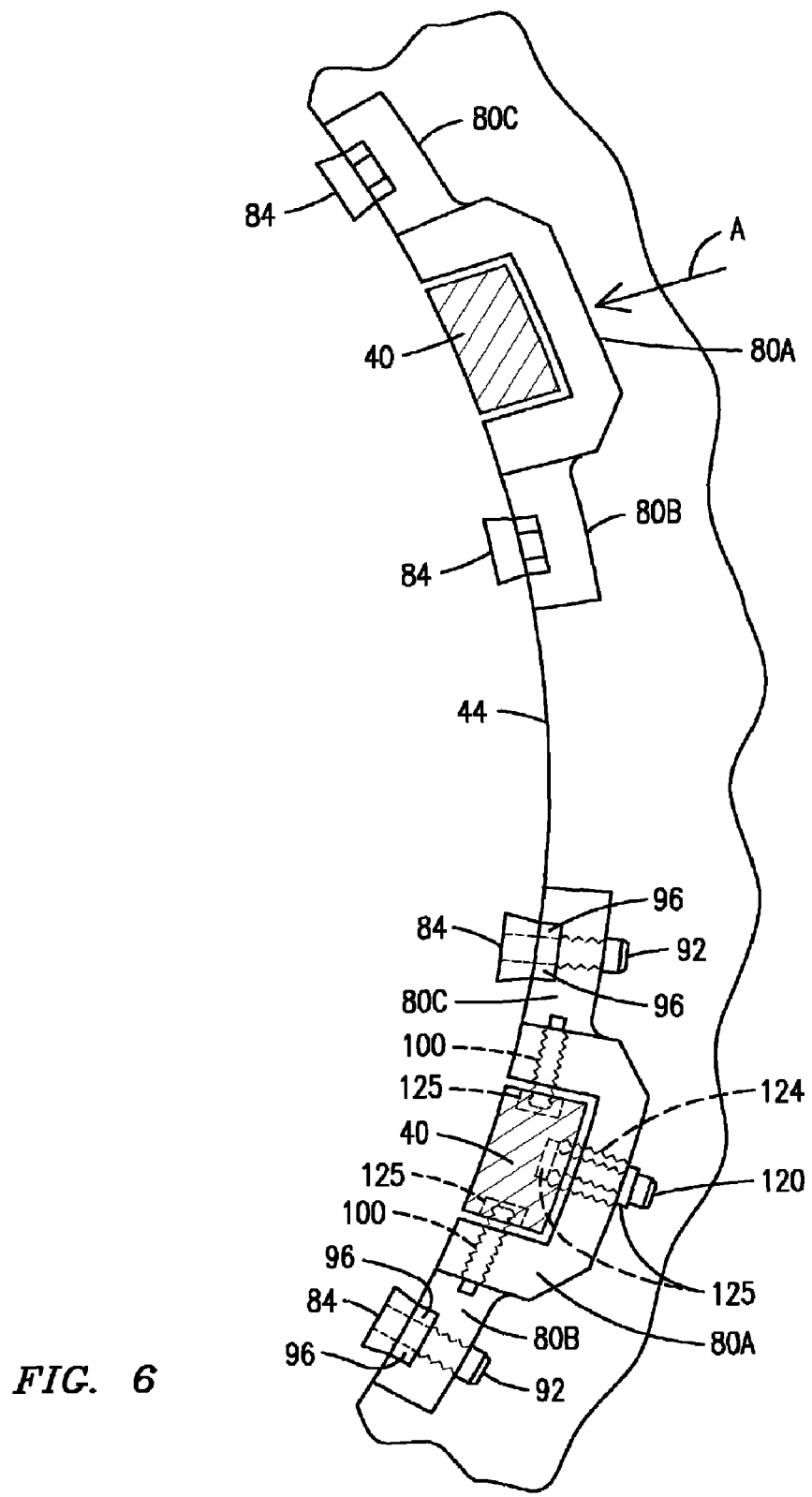
FIG. 6 is a cross sectional illustration of the spring bar and associated components.

FIG. 6 is a cross-sectional view taken along lines 6-6 of FIG. 5. FIG. 6 illustrates two spring bars 40 (and associated structures) one keybar on each diametrical side of a 3 o'clock position. As can be seen in this view, the bracket 80 comprises a U-shaped main body portion 80A and oppositely directed bracket arms 80B and 80C extending from the main body portion 80A. The spring bar 40 is disposed within an opening in the U-shaped main body portion 80A. The keybars 84 are attached to the bracket arms 80B and 80C with fasteners 92 passing through openings 93 (see FIG. 5). Tapered keys 96 (e.g., shims) within the openings 93 permit further adjustment of the keybars 84 prior to tightening the fasteners 92 to affix the keybars 84 to the brackets 80.

It may not be necessary to use the taper keys 96 in all installations. Each installation is unique and therefore details vary for each installation. Thus the present application sets forth various embodiments for resiliently attaching the core to the generator frame and each embodiment may utilize different fastening techniques as needed.

The main body portion 80A of the bracket 80 is affixed to the spring bar 40 using fasteners 100. In one embodiment the fasteners comprise jackscrews and/or threaded adapters, however in other embodiments conventional bolts, cap screws or tapered shims can also be used.

Continuing with FIG. 6, the bracket main body portion 80A is attached to the spring bar 40 using a fastener 120 and a threaded adapter 124. The threaded adapter takes up any designed-in space between an opening in the spring bar 40 and a concentric opening 128 (see FIG. 5) in the main bracket portion 80A, with the fastener 120 passing through both the opening in the spring bar 40 and an opening 128 in the bracket 80. See also FIG. 7.

The spherical seats 125 in FIG. 6 are used to account for any out-of-squareness between the axis of a fastener and its seating plane.

Figure 7:
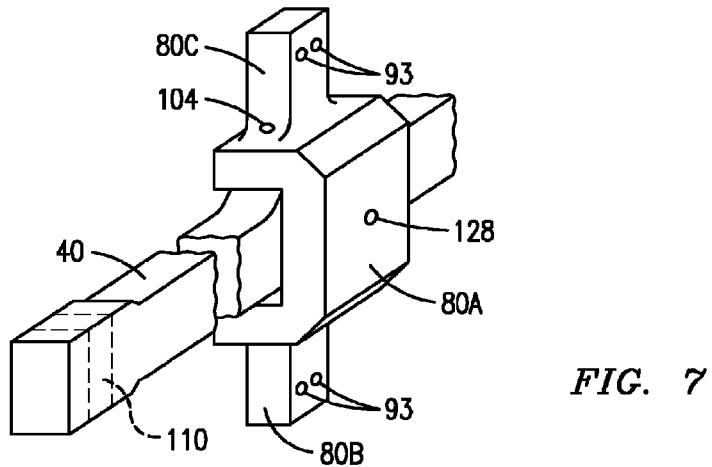
FIG. 7 illustrates an attachment technique for the spring bar of FIGS. 3-6 above.

A close-up view of FIG. 7 depicts openings 104 for receiving the fasteners 100, the openings 93 for receiving the fasteners 92 and the openings 128 for receiving fasteners 120 (as described below). FIG. 7 also generally depicts a region 110 of the spring bar 40 that mates with a corresponding notch in a frame ring.

As is known by those skilled in the art, the present invention comprises multiple designed-in clearances that allow the various structural members to be easily fitted together during installation in the generator frame. But these designed-in clearances must be closed prior to final assembly. Wedges, threaded adapters and shims can be used to close these clearances. Other structural members or fasteners, as are known to those skilled in the art, can also be used.

Figure 8:
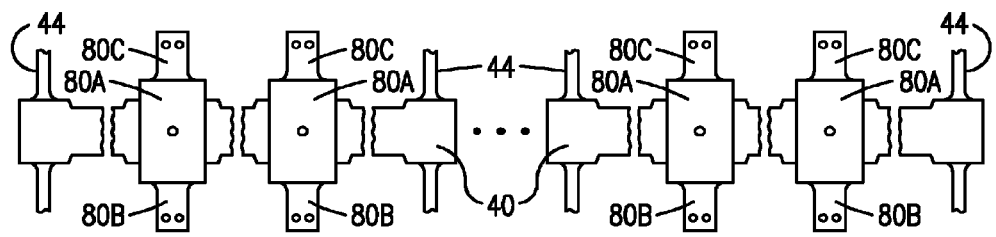
FIG. 8 illustrates two serial spring bars and their associated components attached to generator frame rings.

FIG. 8 illustrates the spring bar 40 and associated structural members when looking in a direction of an "A" arrowhead in FIG. 6. Multiple spring bars (and their associated structural members) are placed end-to-end to span the axial distance of the stator core, i.e., between a first frame ring on one end of the core and a second frame ring on a second end of the core.

In one embodiment, assembly of the structures described and illustrated above proceeds as follows. The spring bars 40, clevises 52 and brackets 80 are attached as described above. Since there is a designed-in clearance between the brackets 80 and the spring bars 40, adjustment between these two members can be made prior to joining the brackets 80 and the spring bar 40 with the fasteners 100 and 120.

The donuts are set inside the generator frame (using temporary rail supports to bear the weight of the donuts and properly vertically position the donuts), aligned and clamped. The keybars 84 are slid into mating grooves in the core donuts and locked in the axial direction. The brackets 80 are fastened to the keybars 84 to radially clamp the keybars and the brackets. The tapered keys 96 are then inserted to tighten the core and the brackets in the tangential direction.

After the brackets 80 have been affixed to the spring bars 40 and the keybars 84, the dead weight of the core is supported by the axial spring bars (as attached to the generator frame through the frame rings) and the temporary rail supports are removed.

Typically, a material of the spring bar 40 comprises an alloy steel. It is not required that the material of the spring bar have any specific or numerical shock absorbing properties. The spring bars 40 are typically made from a high strength steel material to withstand the high stresses imposed on the spring bars during a short circuit or similar event.

Another embodiment is used primarily for four pole generators in which core vibrations and transmission of the vibrations to the generator frame and foundation is acceptably low. It is known by those skilled in the art that four pole generators typically experience lower magnitude vibrations than two pole generators and thus a "high" tuned system may be acceptable for four pole generators. This embodiment does not offer the substantial torque attenuation under transient fault conditions as provided by the spring bar and its associated components in the embodiment described above.

Figure 10:
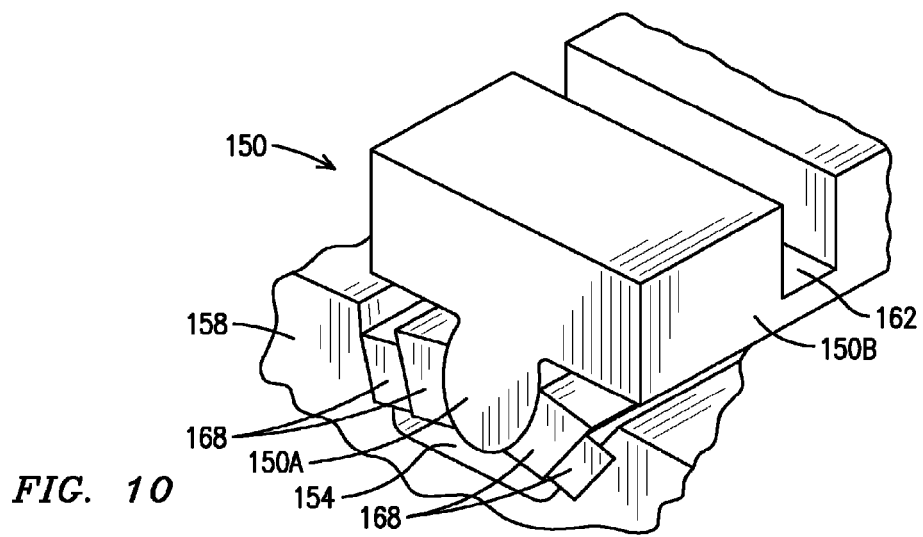
FIG. 10 illustrates a keybar profile of the embodiment of FIG. 9 and structural members for attaching the keybar to the core.
Figure 9:
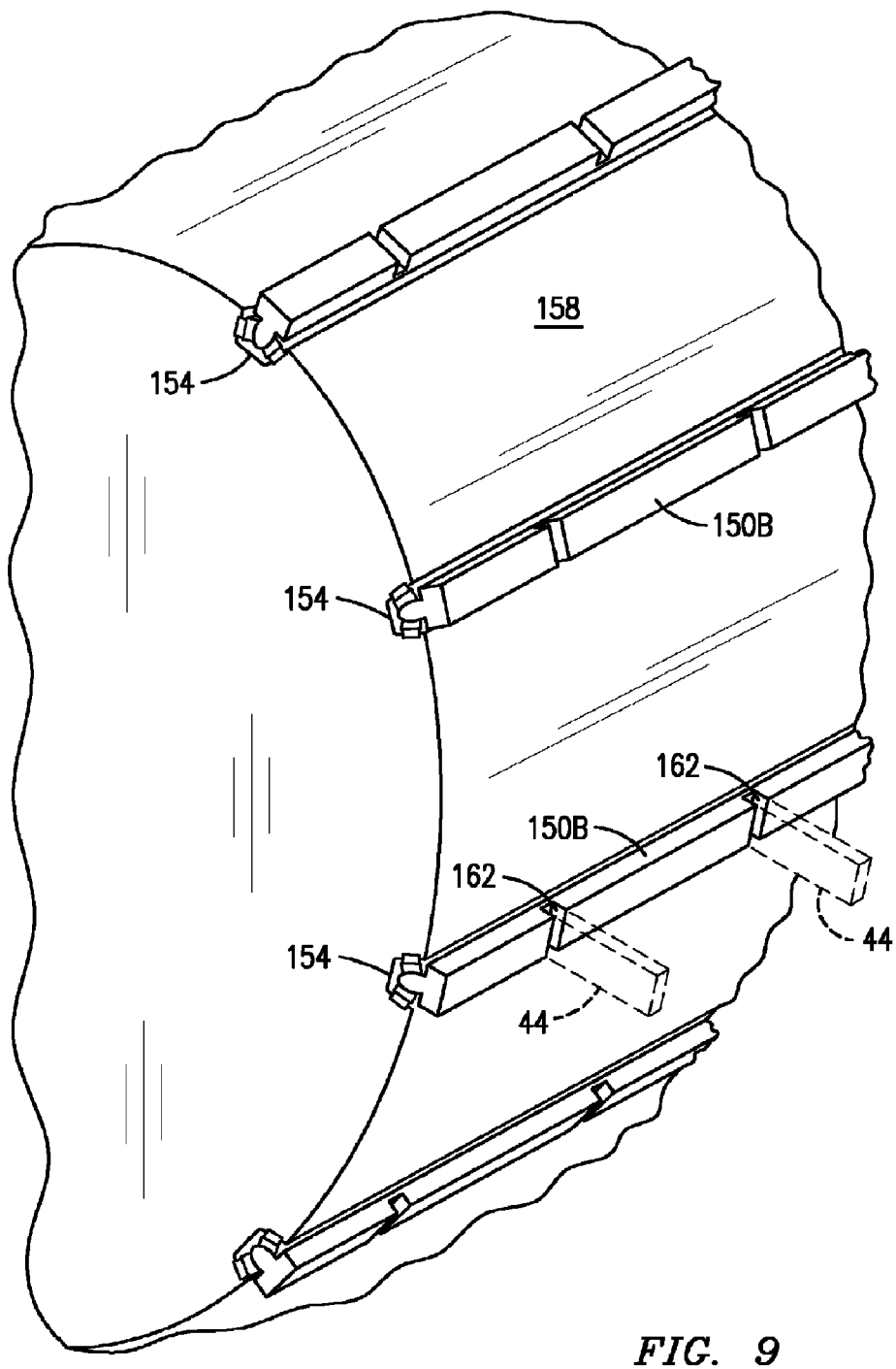
FIG. 9 illustrates an embodiment of the present invention for attaching the core to the generator frame.

FIGS. 9 and 10 illustrate the principal structures of this second embodiment, including keybars 150 having a partial circular shaped projection 150A, extending from a base portion 150B, for mating with complementary axial grooves 154 formed within an outer surface of a core 158 (within the individual donuts or laminations that comprise the core 158). The base portion 150B can be designed with other profile shapes.

Wedges 168 are inserted between the projections 150A and facing surfaces of the groove 154 to join the keybars 150 to the core 158. Shapes other than the illustrated circular shape can also be used. The use of wedges 168 to join the keybars 150 to the core 158 and the designed-in clearance between these surfaces allows adjustment of the keybars and avoids the need for precise location of the keybars relative to the axial grooves 154 in the core 158.

Like the keybars 84 in the embodiment described above, the keybars 150 can be formed by extrusion or by welding several keybar lengths together.

The frame rings 44 (shown in phantom in FIG. 9) are received within notches 162 formed in the outwardly-facing surfaces of the base portion 150B of the keybars 150. The keybars 150 can be adjusted circumferentially as required for mating with the axial grooves 154 in the core 158. Once correctly positioned, surfaces of the frame rings 44 in contact with notch surfaces in the base portion 150B are welded. Alternatively the notches can be formed in the frame rings 44 for mating with the keybars 150, however this technique limits the circumferential range through which the keybars 150 can be adjusted. In either case, the keybars 150 are distributed at several locations around the circumference of the core.

Generally, according to this embodiment the keybars 150 are first welded to the frame rings 44 then the laminations or donuts are inserted (by sliding) into the keybars 150.

The embodiments of the present invention can be used to assemble rigid core donut sections into any stator frame that has frame rings. The invention also permits replacement of any keybar-to-core attachment devices with new keybars having a profile designed to function with existing core donuts or core laminations. The invention permits relatively easy horizontal installation of the donuts due to the generous installation clearances between the axial grooves in the donuts and the keybars received within those grooves. But the invention also reduces the possibility of radial slack and motion.

In the various described embodiments the donuts may be stacked horizontally to form the core. Thus two keybars, disposed along a bottom surface of the core, may bear the dead weight of the core as the process for attaching the core to the frame progresses. These keybars can be located anywhere below the core centerline.

Certain regions of the generator frame are high pressure regions (i.e., a gas under pressure) whereas other regions are low pressure regions. Thus it is important to isolate these regions; the use of the various structural members and attachment techniques described herein are designed and intended to maintain this pressure differential.

Various keybar profiles have been described and illustrated herein. Those skilled in the art recognize that other profile shapes can accomplish the desired objectives. A circularly shaped profile is illustrated in co-owned U.S. Pat. No. 7,202,587. Also, it is considered beneficial to use tapered keys and wedges to affix the keybars to the core grooves to overcome distortions in the keybars, and attendant installation difficulties, caused by welding. Finally, the use of profiled keybars and the spring bars obviates the prior art requirement for extreme accuracy in positioning these structural members.

Radial looseness between the core and the generator frame is reduced when any of the various embodiments described herein is used. Reducing this radial looseness minimizes the need for later radial tightening of the core within the frame. Reducing the radial looseness also reduces generator noise.

Advantageously, any of the methods described for attaching the core to the generator frame can be performed at the generator site without requiring lifting or moving the generator frame from its foundation.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A generator comprising:
   a generator frame;
   frame rings extending from an inside surface of the generator frame;
   stacked laminations forming a stator core disposed within the generator frame;
   a spring bar spanning a distance between at least two frame rings, a first spring bar end attached to a first frame ring and a second opposing spring bar end attached to a second frame ring;
   at least one bracket attached to the spring bar; and
   a first and a second keybar attached to the bracket, each keybar for engaging a corresponding groove within the stator core.

2. The generator of claim 1 wherein the spring bar spans a distance including an intermediate frame ring between the first and the second frame rings.

3. The generator of claim 1 wherein the spring bar spans a distance between two consecutive frame rings.

4. The generator of claim 1 wherein the stacked laminations comprise a plurality of subgroups of laminations, each subgroup comprising a plurality of laminations and the plurality of subgroups forming the stator core.

5. The generator of claim 1 wherein a profile of the first and the second keybars for mating with a complementary axial groove in the core comprises one of a circular shape, an elliptical shape, a tapered shape and a dovetail shape.

6. The generator of claim 1 wherein the first and second frame rings each define a notch therein for receiving a respective first and second clevis, the first and second clevis affixed to the respective first and second frame ring, the first and second spring bar ends affixed to the respective first and second clevis.

7. The generator of claim 6 further comprising first and second designed-in clearances between the respective first spring bar end and the first clevis and the second spring bar end and the second clevis, wherein attachment components take up the first and second designed-in clearances.

8. The generator of claim 7 further comprising a wedge between each of the first and second spring bar ends and an opposing surface of the respective first and second clevis.

9. The generator of claim 1 wherein the at least one bracket comprises a first and a second bracket attached to the spring bar, the first and second keybars attached to both the first and second brackets.

10. The generator of claim 1 wherein a torsional frequency of the stator core and stator windings is less than forcing frequencies created during a transient event.

11. The generator of claim 1 wherein the generator comprises a two-pole generator or a four-pole generator.

12. The generator of claim 1 wherein the first and second spring bar ends are attached to the respective frame ring by welding.

13. The generator of claim 1 wherein a first designed-in clearance is defined between each spring bar end and the respective first and second frame rings, and a second designed-in clearance is defined between the bracket and the spring bar, and a third designed-in clearance is defined between the first and the second keybars and the bracket, and wherein attachment components take up the first, the second and the third designed-in clearances.

14. The generator of claim 1 wherein the bracket is welded to the spring bar or fasteners attach the bracket to the spring bar.

15. The generator of claim 1 wherein the spring bar, the bracket and the first and second keybars provide a resilient attachment between the core and the generator frame.

16. A generator comprising:
    a generator frame;
    frame rings extending from an inside surface of the frame;
    stacked laminations forming a stator core disposed within the generator frame; and
    a plurality of keybars affixed to the stator core by a projection extending from a first surface of each keybar, the projection extending into a corresponding groove in the generator core, and an opposing second surface of each keybar affixed to at least two frame rings.

17. The generator of claim 16 wherein the plurality of keybars span a distance including an intermediate frame ring between the at least two frame rings.

18. The generator of claim 16 wherein the plurality of keybars span a distance between two consecutive frame rings.

19. The generator of claim 16 wherein the frame rings each define a notch therein for receiving the second surface of each keybar, the second surface affixed to the at least two frame rings by welding.

20. The generator of claim 16 wherein the second surface of each keybar defines one or more notches therein, each notch for receiving a frame ring, the second surface affixed to the at least two frame rings by welding.

21. A method for installing a generator stator core within a generator frame, the method comprising:
    attaching a first spring bar end to a first frame ring and second spring bar end to a second frame ring, the frame rings extending from an inside surface of the frame;
    attaching at least one bracket to the spring bar;
    stacking core laminations to form a stator core within the generator frame;
    fitting keybars within axial grooves of the stator core; and
    attaching the keybars to the at least one bracket.

22. The method of claim 21 wherein the step of stacking comprises vertical stacking or horizontal stacking.

23. The method of claim 21 wherein the step of attaching a first and a second spring bar end further comprises forming a notch in the first and second frame rings, affixing a first and a second clevis within the notch in the respective first and second frame rings, and attaching the first spring bar end to the first clevis and the second spring bar end to the second clevis.

24. A method for installing a generator stator core within a generator frame, the method comprising:
    stacking core laminations to form a stator core within the generator frame;

fitting a profiled surface of keybars within axial grooves of the stator core, the keybars having notches formed in a surface opposing the profiled surface; and attaching a first and a second frame ring to the notches, the frame rings extending from an inside surface of the frame.

25. The method of claim 24 wherein the step of attaching comprises welding the first and second frame rings to the notches.

* * * * *